US011755152B2

(12) United States Patent
Teraoka et al.

(10) Patent No.: US 11,755,152 B2
(45) Date of Patent: Sep. 12, 2023

(54) PROJECTOR WITH DETECTION FUNCTION FOR STABILIZING INTENSITY DISTRIBUTION OF AN IRRADIATION BEAM

(71) Applicant: SONY CORPORATION, Tokyo (JP)

(72) Inventors: Yoshiyuki Teraoka, Kanagawa (JP); Kazumasa Kaneda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/487,305

(22) PCT Filed: Feb. 15, 2018

(86) PCT No.: PCT/JP2018/005231
§ 371 (c)(1),
(2) Date: Aug. 20, 2019

(87) PCT Pub. No.: WO2018/173559
PCT Pub. Date: Sep. 27, 2018

(65) Prior Publication Data
US 2020/0019277 A1 Jan. 16, 2020

(30) Foreign Application Priority Data
Mar. 23, 2017 (JP) .............................. JP2017-057219

(51) Int. Cl.
*G06F 3/042* (2006.01)
*G06T 7/70* (2017.01)
(Continued)

(52) U.S. Cl.
CPC .............. *G06F 3/0425* (2013.01); *G06T 7/70* (2017.01); *H04N 23/56* (2023.01); *H04N 23/72* (2023.01);
(Continued)

(58) Field of Classification Search
CPC .................................................. G06F 3/0425
See application file for complete search history.

(56) References Cited

U.S. PATENT DOCUMENTS

2002/0067341 A1  6/2002 Kobayashi
2009/0067459 A1*  3/2009 Mizuuchi ............... G02B 27/48
                                                         372/25
(Continued)

FOREIGN PATENT DOCUMENTS

CN    105474092 A    4/2016
CN    106415439 A    2/2017
(Continued)

OTHER PUBLICATIONS

Extended European Search Report of EP Application No. 18771652.7, dated Mar. 9, 2020, 08 pages.
(Continued)

*Primary Examiner* — Sahlu Okebato
*Assistant Examiner* — Andrew B Schnirel
(74) *Attorney, Agent, or Firm* — CHIP LAW GROUP

(57) ABSTRACT

A projector with a detection function according to the present disclosure includes: a projection optical system that projects image light on a projection plane; an irradiation optical system that generates an irradiation beam on the basis of light obtained from a light source, and outputs the irradiation beam, in which the irradiation beam is used for detection of a detection object on the projection plane, and the detection object is configured to be detected; an imaging device that scattered light of the irradiation beam derived from the detection object enters; and an illumination control section that performs temporal light-quantity modulation of the light obtained from the light source to cause coherence of the irradiation beam to be reduced.

10 Claims, 10 Drawing Sheets

(51) Int. Cl.
*H04N 23/56* (2023.01)
*H04N 23/72* (2023.01)
*H04N 9/31* (2006.01)

(52) U.S. Cl.
CPC .. *G06T 2207/10152* (2013.01); *H04N 9/3197* (2013.01)

(56) References Cited

U.S. PATENT DOCUMENTS

| | | | | |
|---|---|---|---|---|
| 2009/0174657 | A1* | 7/2009 | Miyazaki | A63F 13/24 345/158 |
| 2009/0284713 | A1* | 11/2009 | Silverstein | G02B 27/48 353/8 |
| 2011/0251905 | A1* | 10/2011 | Lawrence | G06F 3/0425 705/15 |
| 2014/0362052 | A1* | 12/2014 | McCaughan | G06F 3/0426 345/175 |
| 2016/0196005 | A1* | 7/2016 | Kaneda | G03B 11/00 348/744 |
| 2016/0277719 | A1 | 9/2016 | Tan et al. | |
| 2017/0123218 | A1* | 5/2017 | Stigwall | G01B 11/2518 |
| 2017/0228057 | A1 | 8/2017 | Kaneda | |
| 2018/0203248 | A1* | 7/2018 | op 't Root | G01J 3/027 |
| 2018/0303573 | A1* | 10/2018 | Trulson | A61B 5/0071 |

FOREIGN PATENT DOCUMENTS

| | | | |
|---|---|---|---|
| CN | 106716318 | A | 5/2017 |
| EP | 3039483 | A1 | 7/2016 |
| EP | 3072032 | A1 | 9/2016 |
| EP | 3227766 | A1 | 10/2017 |
| JP | 2014-529925 | A | 11/2014 |
| JP | 2015-064550 | A | 4/2015 |
| JP | 2015-079214 | A | 4/2015 |
| JP | 2016-057426 | A | 4/2016 |
| JP | 2016-114991 | A | 6/2016 |
| JP | 6372266 | B2 | 8/2018 |
| TW | 201523396 | A | 6/2015 |
| WO | 2015/029365 | A1 | 3/2015 |
| WO | 2015/076811 | A1 | 5/2015 |
| WO | WO 2015/029365 | * | 5/2015 ............. G03B 21/28 |
| WO | 2016/038839 | A1 | 3/2016 |
| WO | 2016/067397 | A1 | 5/2016 |
| WO | 2016/125384 | A1 | 8/2016 |

OTHER PUBLICATIONS

International Search Report and Written Opinion of PCT Application No. PCT/JP2018/005231, dated Apr. 24, 2018, 10 pages of ISRWO.

Office Action for JP Patent Application No. 2019-507434, dated Jul. 27, 2021, 8 pages of Office Action and 4 pages of English Translation.

* cited by examiner

[FIG. 1]
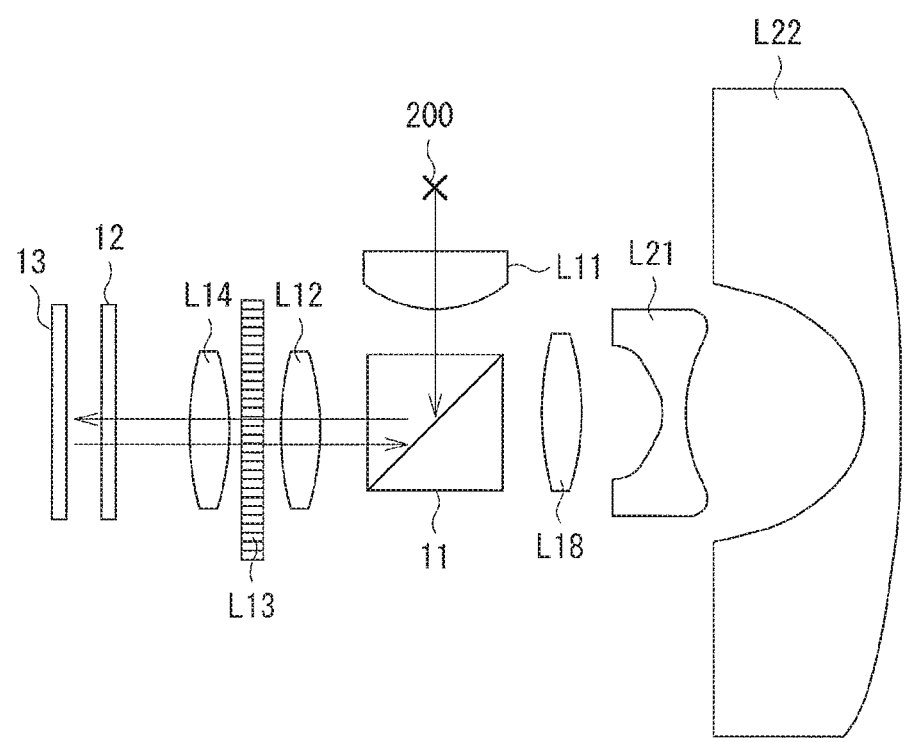

[FIG. 2]
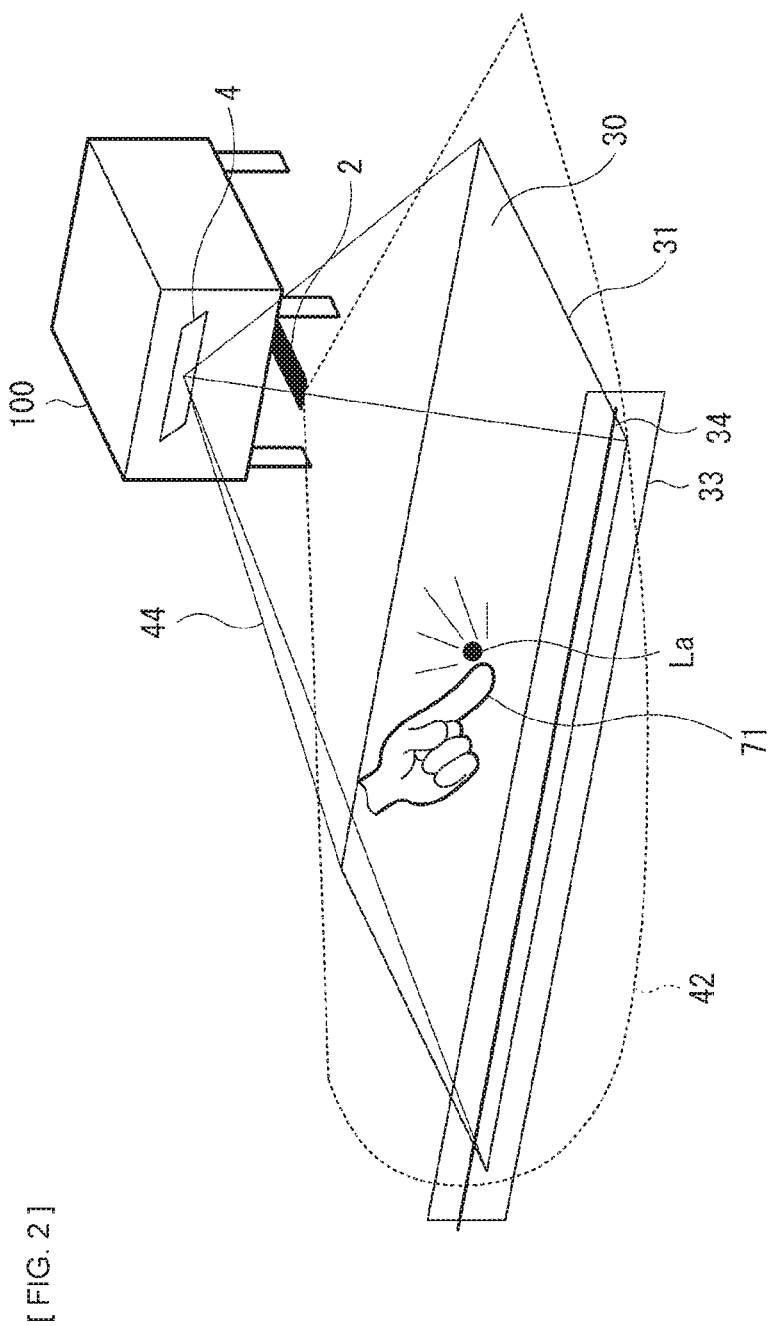

[FIG. 3]
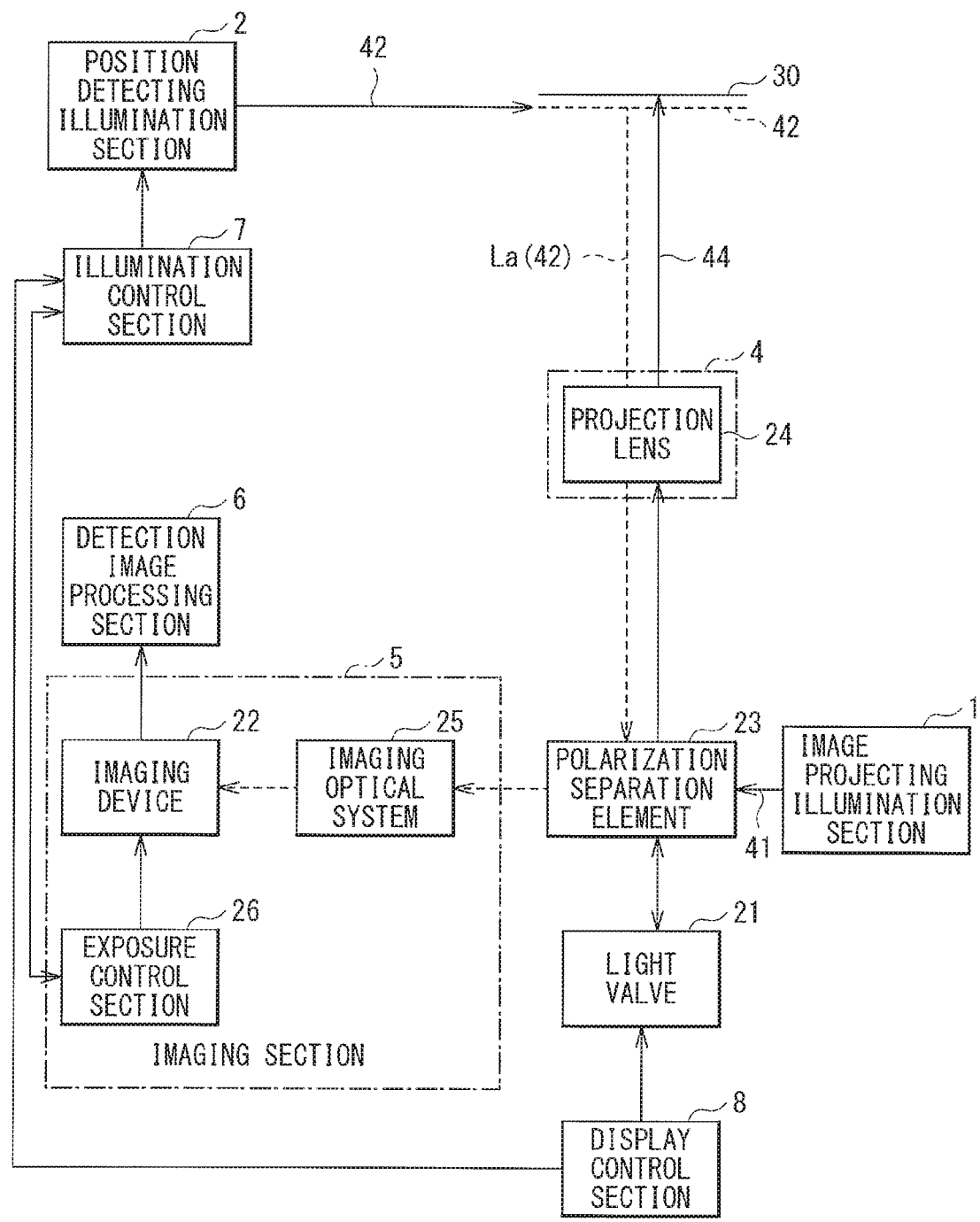

[FIG. 4]
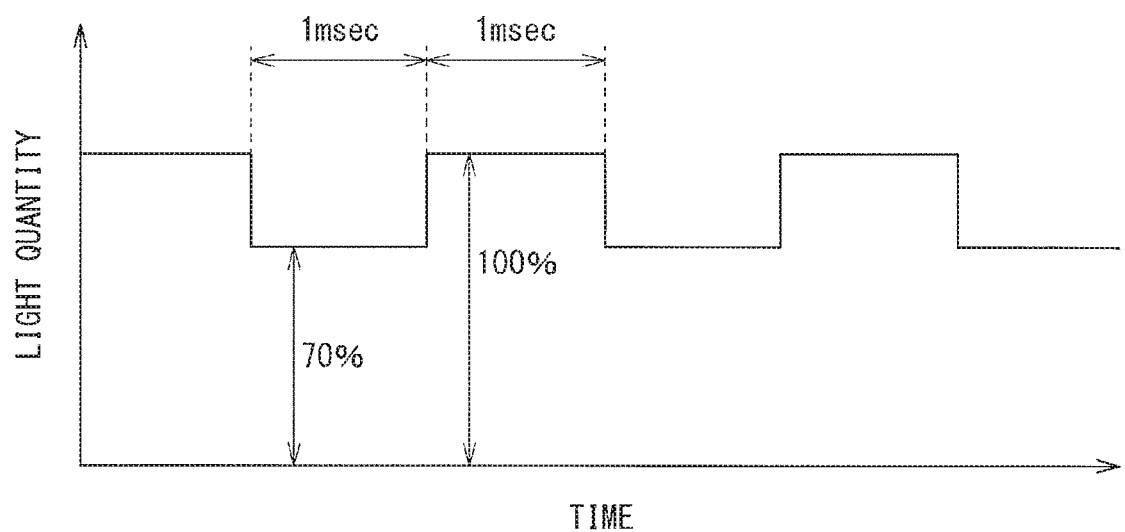

[FIG. 5]
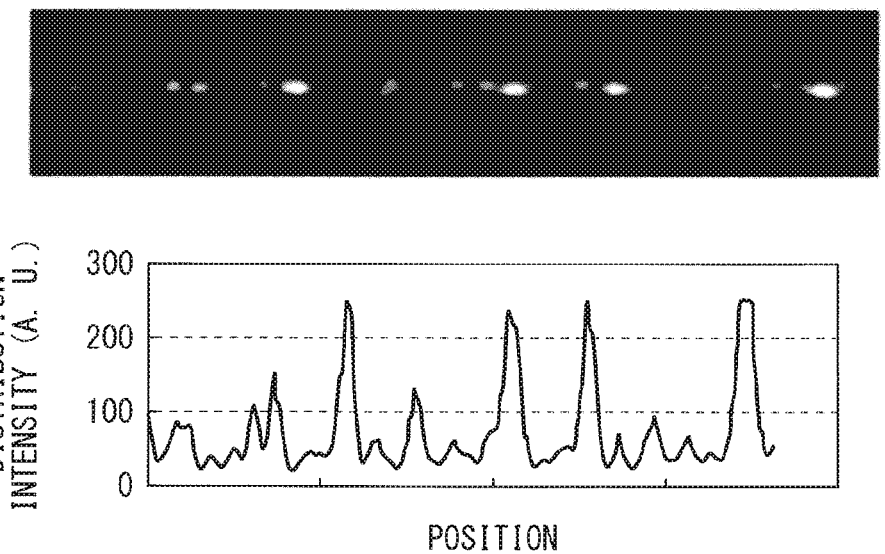
[FIG. 6]
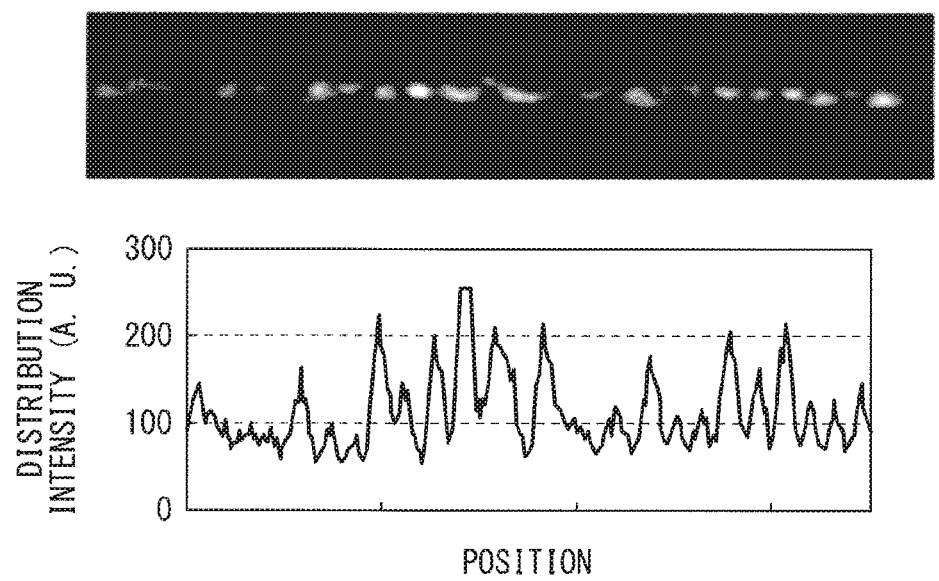

[ FIG. 7 ]
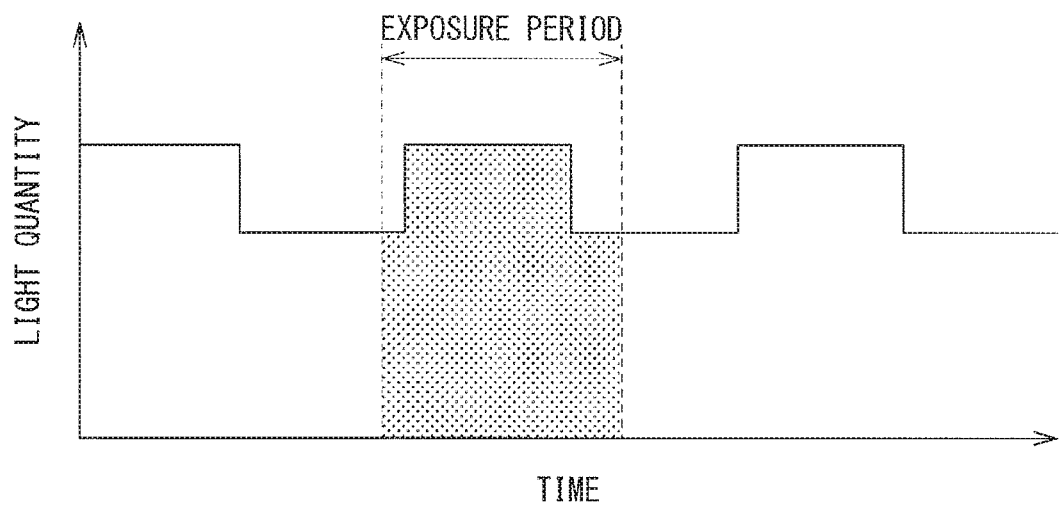
[ FIG. 8 ]
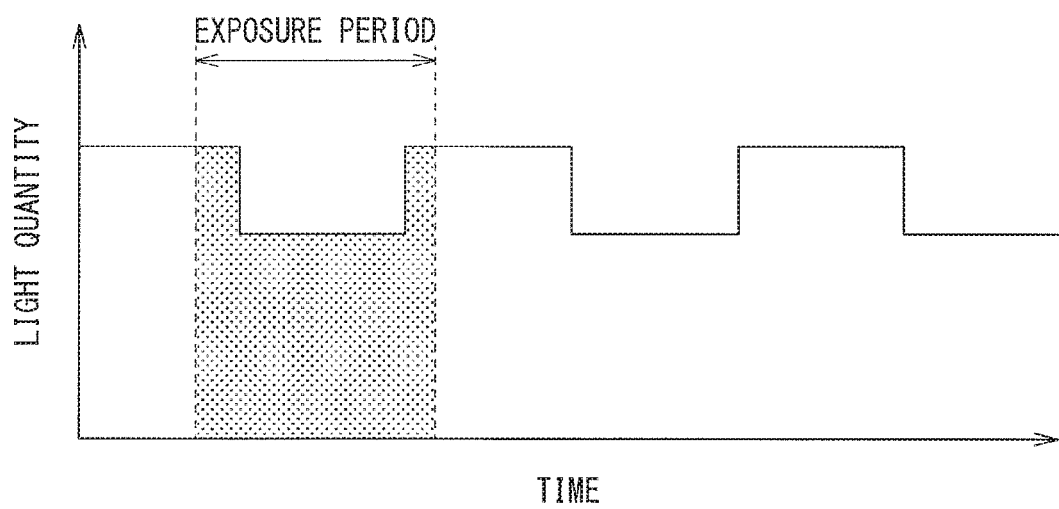

[ FIG. 9 ]
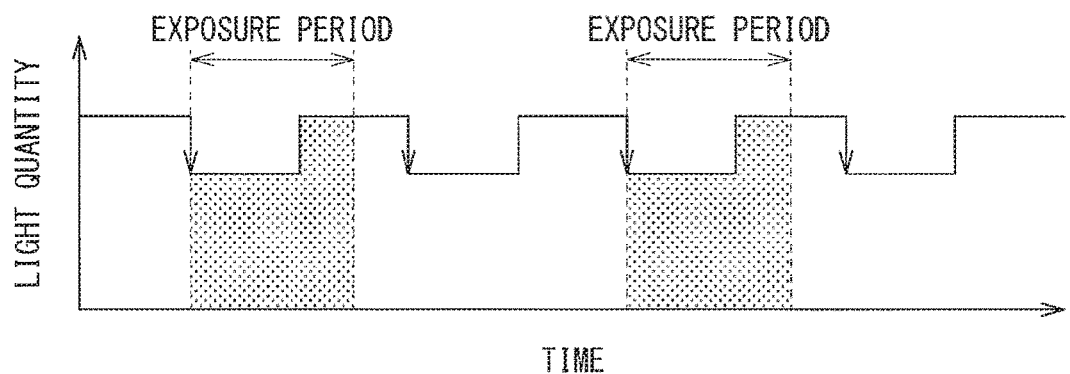
[ FIG. 10 ]
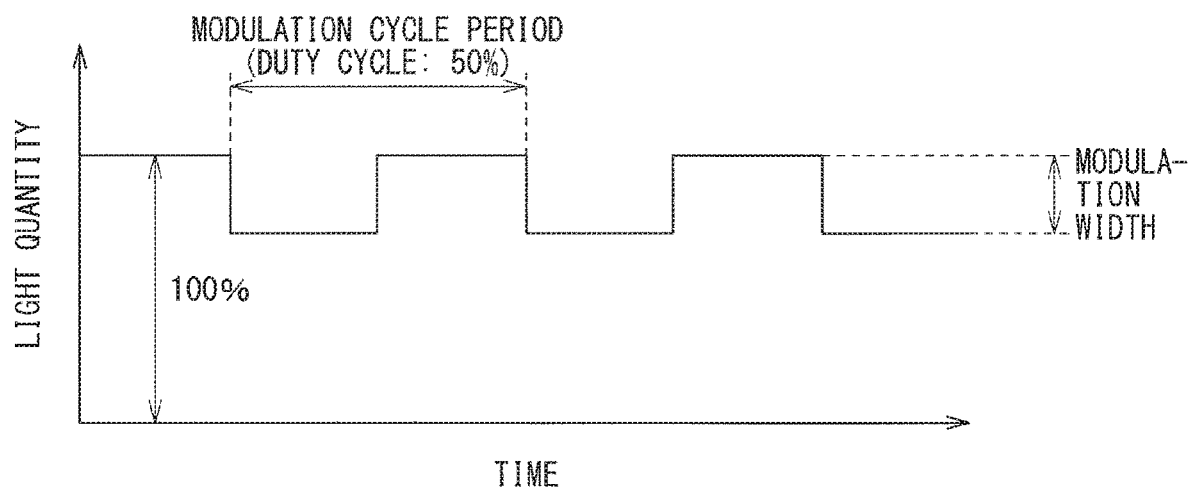

[ FIG. 11 ]
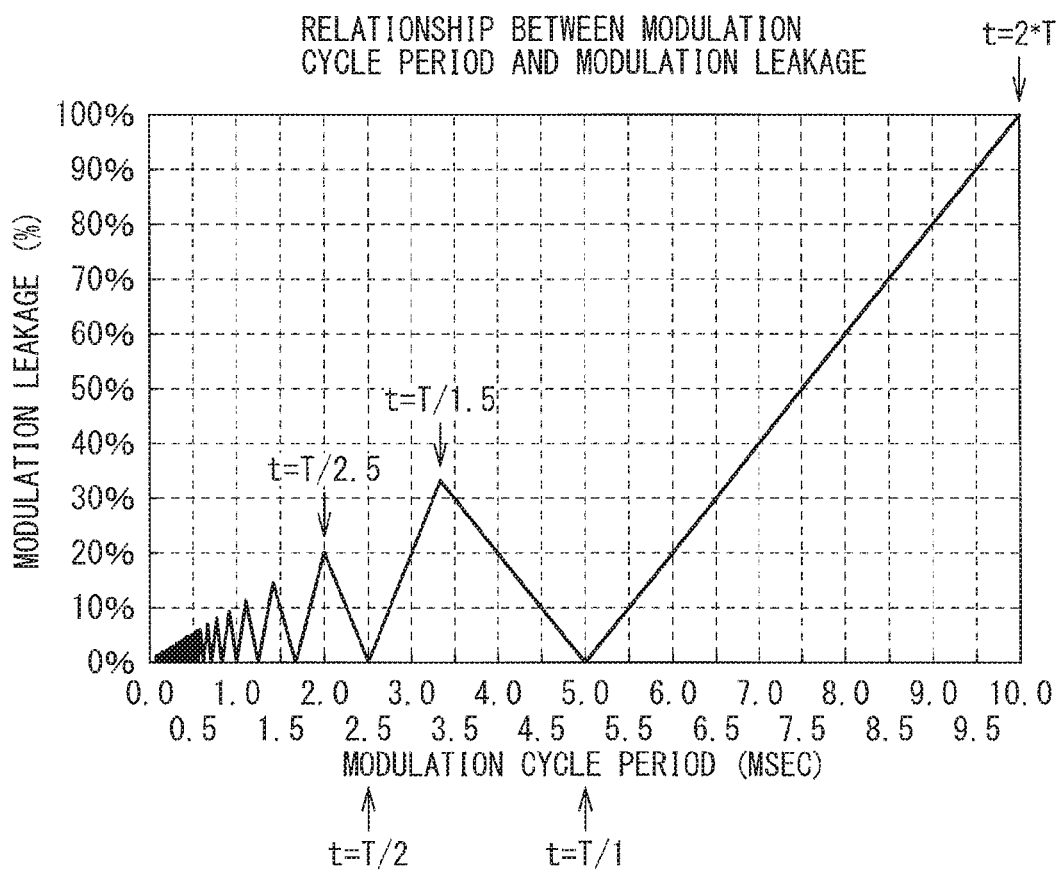

[ FIG. 12 ]
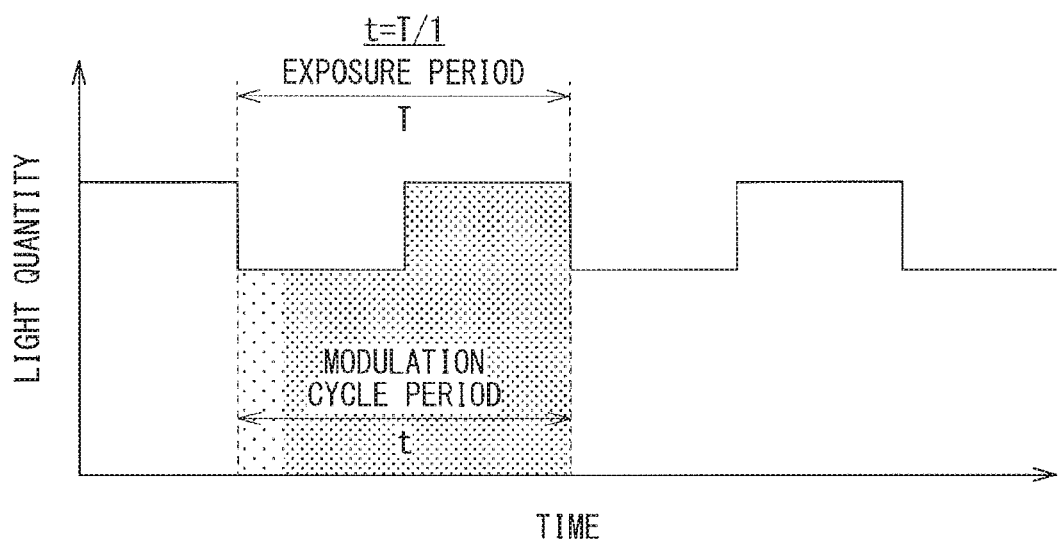
[ FIG. 13 ]
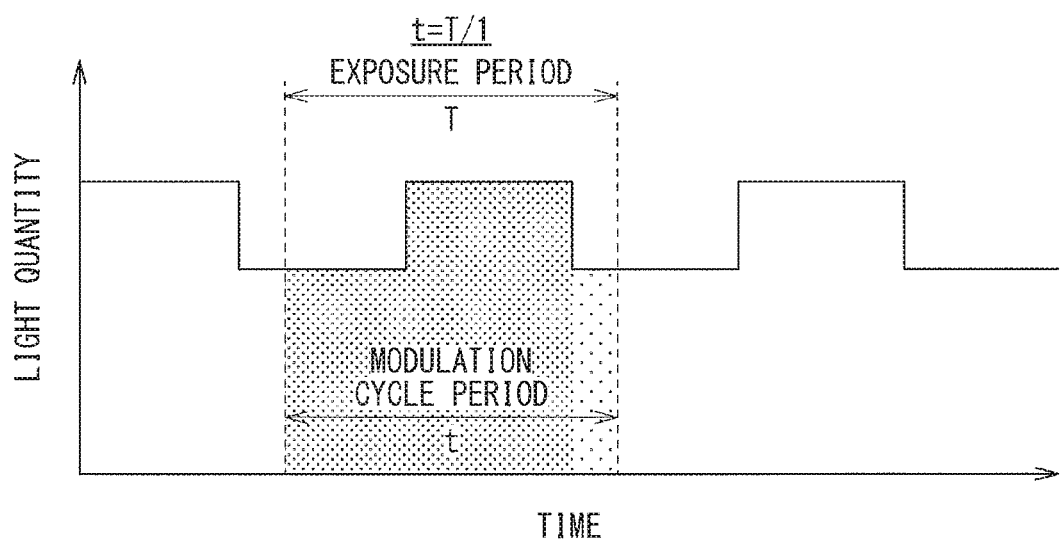

[ FIG. 14 ]
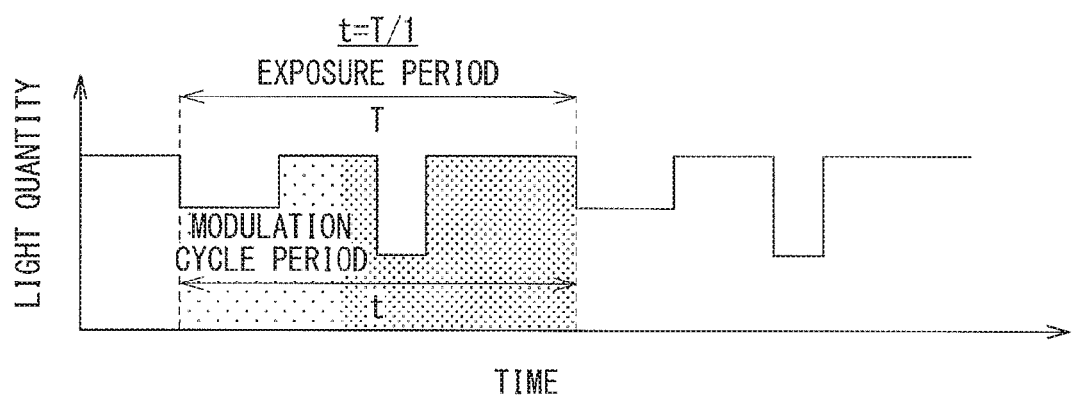
[ FIG. 15 ]
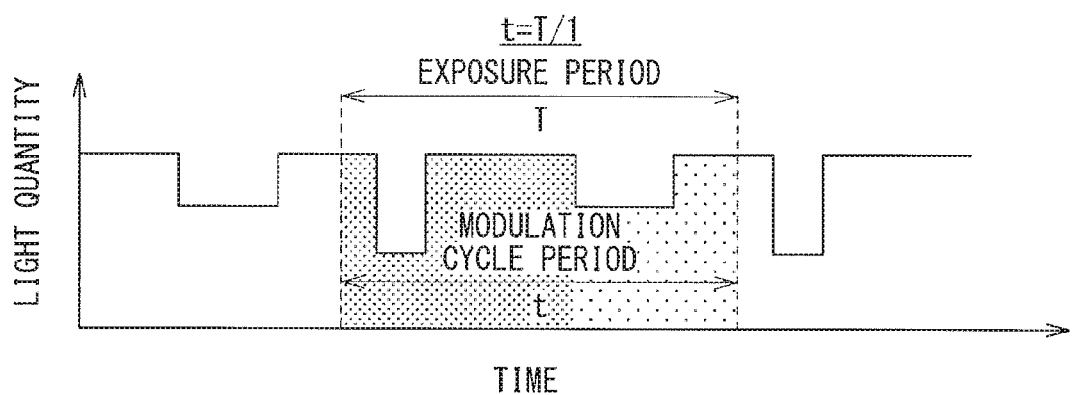

PROJECTOR WITH DETECTION FUNCTION FOR STABILIZING INTENSITY DISTRIBUTION OF AN IRRADIATION BEAM

CROSS REFERENCE TO RELATED APPLICATIONS

This application is a U.S. National Phase of International Patent Application No. PCT/JP2018/005231 filed on Feb. 15, 2018, which claims priority benefit of Japanese Patent Application No. JP 2017-057219 filed in the Japan Patent Office on Mar. 23, 2017. Each of the above-referenced applications is hereby incorporated herein by reference in its entirety.

TECHNICAL FIELD

The present disclosure relates to a projector with a detection function having an image projection function and an object detection function.

BACKGROUND ART

In recent years, in a smartphone, a tablet terminal, etc., the use of a touch panel has allowed for touch operation responding to human intuition. In turn, in a projector that projects images on a screen, a technology has been developed that enables the touch operation with the use of LLP (Laser Light Plane) method. The LLP method uses a beam irradiation apparatus including a laser light source to irradiate a projection plane of the projector with a membrane-shaped irradiation beam as illuminating light for detection in a manner of covering the projection plane with a narrow clearance left between. When a detection object such as a finger moves across the membrane-shaped irradiation beam, scattered light is generated at the location that the object moves across. The scattered light is detected as detection light by the use of a camera. This makes it possible to achieve the touch operation on the basis of determination of an object position. In the LLP method, an infrared light beam is typically used to make the illuminating light for detection invisible.

CITATION LIST

Patent Literature

PTL 1: Japanese Unexamined Patent Application Publication No. 2015-64550
PTL 2: International Publication No. WO2016/125384

SUMMARY OF THE INVENTION

In a case where a touch operation function is achieved using the LLP method, it is quite important that an intensity distribution of the irradiation beam to be used as the illuminating light for detection is stable in terms of the accuracy of touch detection and the stability of a detection signal.

It is desirable to provide a projector with a detection function that allows for stabilizing the intensity distribution of the irradiation beam.

A projector with a detection function according to an embodiment of the present disclosure includes: a projection optical system that projects image light on a projection plane; an irradiation optical system that generates an irradiation beam on the basis of light obtained from a light source, and outputs the irradiation beam, in which the irradiation beam is used for detection of a detection object on the projection plane, and the detection object is configured to be detected; an imaging device that scattered light of the irradiation beam derived from the detection object enters; and an illumination control section that performs temporal light-quantity modulation of the light obtained from the light source to cause coherence of the irradiation beam to be reduced.

In the projector with the detection function according to the embodiment of the present disclosure, the light obtained from the light source that serves as a base of the irradiation beam to be used for detection of the detection object is subjected to the temporal light-quantity modulation to cause the coherence of the irradiation beam to be reduced.

The projector with the detection function according to the embodiment of the present disclosure performs the temporal light-quantity modulation of the light obtained from the light source that serves as a base of the irradiation beam to be used for detection of the detection object to cause the coherence of the irradiation beam to be reduced, which makes it possible to stabilize the intensity distribution of the irradiation beam.

It is to be noted that effects described above are not necessarily limitative, and any of effects described in the present disclosure may be provided.

BRIEF DESCRIPTION OF DRAWINGS

FIG. 1 is a schematic configuration diagram of an example of a beam irradiation apparatus according to a first embodiment of the present disclosure.

FIG. 2 is a schematic configuration diagram of an example of a projector with a detection function according to the first embodiment.

FIG. 3 is a schematic block diagram of a functional configuration example of the projector with the detection function according to the first embodiment.

FIG. 4 describes an example of light-quantity modulation of an irradiation beam in the projector with the detection function according to the first embodiment.

FIG. 5 describes an example of an intensity distribution of an irradiation beam to be observed with the light-quantity modulation put in Off state.

FIG. 6 describes an example of the intensity distribution of an irradiation beam to be observed with the light-quantity modulation put in On state.

FIG. 7 describes an example of a relationship between an exposure period and light quantity in a case where exposure is performed in first exposure timing.

FIG. 8 describes an example of a relationship between the exposure period and the light quantity in a case where exposure is performed in second exposure timing.

FIG. 9 describes an example of a relationship between the exposure period and the light quantity in a case where shutter timing and timing of the light-quantity modulation are synchronized with each other.

FIG. 10 describes an example of the light-quantity modulation of an irradiation beam in the projector with the detection function according to the first embodiment.

FIG. 11 describes an example of a relationship between a modulation cycle period and modulation leakage of the light-quantity modulation.

FIG. 12 describes an example of a relationship between the exposure period and the light quantity in the first exposure timing in a case where two-valued light-quantity modulation is performed.

FIG. 13 describes an example of a relationship between the exposure period and the light quantity in the second exposure timing in a case where the two-valued light-quantity modulation is performed.

FIG. 14 describes an example of a relationship between the exposure period and the light quantity in the first exposure timing in a case where multiple-valued light-quantity modulation is performed.

FIG. 15 describes an example of a relationship between the exposure period and the light quantity in the second exposure timing in a case where the multiple-valued light-quantity modulation is performed.

MODES FOR CARRYING OUT THE INVENTION

Hereinafter, some embodiments of the present disclosure will be described in detail with reference to the drawings. It is to be noted that descriptions are given in the following order.
1. First Embodiment
 1.1 Overview of Beam Irradiation Apparatus (FIG. 1)
 1.2 Overview of Projector with Detection Function (FIGS. 2 and 3)
 1.3 Description of Technique of Reducing Coherence of Irradiation Beam (FIGS. 4 to 15)
 1.4 Effects
2. Other Embodiments

1. First Embodiment

1-1. Overview of Beam Irradiation Apparatus

FIG. 1 illustrates, in a schematic manner, an example of a beam irradiation apparatus according to a first embodiment of the present disclosure.

The beam irradiation apparatus includes an infrared light source 200, and an irradiation optical system that outputs an irradiation beam obtained by expanding light obtained from the infrared light source 200 in a one-dimensional direction.

The infrared light source 200 is a laser light source that emits infrared light.

The irradiation optical system includes a plurality of optical elements disposed on an optical path of the light obtained from the infrared light source 200. In a configuration example in FIG. 1, as the plurality of optical elements, the irradiation optical system includes a collimator lens L11, a polarization separation element 11, a relay lens L12, a cylindrical lens array L13, a relay lens L14, a λ/4 plate 12, a mirror 13, a relay lens L18, a first irradiation lens L21, and a second irradiation lens L22.

Of the plurality of these optical elements, the lens elements excluding the collimator lens L11 take cylindrical shapes, having no lens actions in the direction orthogonal to the one-dimensional direction in which a beam spreads. The one-dimensional direction in which the beam spreads is a direction in a plane of paper in FIG. 1, and the lens elements excluding the collimator lens L11 have lens actions in the plane of paper in FIG. 1. The collimator lens L11 has an action of rendering the light obtained from the infrared light source 200 into substantially collimated light.

In the irradiation optical system illustrated in FIG. 1, the infrared light source 200 and the collimator lens L11 are disposed in a first direction relative to the polarization separation element 11. The relay lens L12, the cylindrical lens array L13, the relay lens L14, the λ/4 plate 12, and the mirror 13 are disposed in a second direction (on an optical path of the light obtained from the infrared light source 200 that is folded back by the polarization separation element 11). The relay lens L18, the first irradiation lens L21, and the second irradiation lens L22 are disposed in a third direction (on opposite side of the second direction relative to the polarization separation element 11).

The polarization separation element 11 reflects a first polarized component (for example, an S-polarized component) of the light obtained from the infrared light source 200 toward a direction in which the cylindrical lens array L13, the mirror 13, etc. are disposed. The polarization separation element 11 also outputs a second polarized component (for example, a P-polarized component) of the light that is reflected by the mirror 13 to re-enter the cylindrical lens array L13, etc. toward the first irradiation lens L21 and the second irradiation lens L22 through the relay lens L18. The λ/4 plate 12 is provided for conversion between the first polarized component and the second polarized component.

The first irradiation lens L21 and the second irradiation lens L22 are wide-angle lenses each having a negative refractive power in the one-dimensional direction, and a light-expanding action only in the one-dimensional direction. The first irradiation lens L21 and the second irradiation lens L22 expand the light outgoing from the polarization separation element 11 in the one-dimensional direction through the relay lens L18 to output the resulting light as an irradiation beam.

1.2 Overview of Projector with Detection Function

Each of FIG. 2 and FIG. 3 illustrates an example of a projector with a detection function that uses an irradiation beam from the beam irradiation apparatus illustrated in FIG. 1 as illuminating light for detection of an object.

The projector with the detection function according to the present embodiment has a function of a projector that projects images on a projection plane 30, and a touch detection (a position detection) function to detect the position and movement of an object 71 whose position is to be detected such as a human finger, for example, on the projection plane 30.

It is to be noted that the projection plane 30 may be a screen for projection use. Alternatively, the projection plane 30 may be any of a desktop surface, a floor surface, etc. Further, the projection plane 30 may be any of a wall surface, etc.

As illustrated in FIG. 2 and FIG. 3, the projector with the detection function according to the present embodiment includes an image projecting illumination section 1, a position detecting illumination section 2, a projection optical system 4, an imaging section 5, a detection image processing section 6, an illumination control section 7, and a display control section 8. The projector with the detection function according to the present embodiment further includes a light valve 21 and a polarization separation element 23.

The image projecting illumination section 1 serves as a first illumination section that outputs image projecting illumination light 41 as first illumination light. The light valve 21 is illuminated with the image projecting illumination light 41 that is outputted from the image projecting illumination section 1 through the polarization separation element 23.

The image projecting illumination section 1 includes an illumination optical system and a light source section, both of which are unillustrated. The light source section includes a laser light source that emits light having the spectra of R (red), G (green), and B (blue), for example. The light source section includes, for example, a blue laser to emit B light, a green laser to emit G light, and a red laser to emit R light. The light emission of each of the red laser, the green laser, and the blue laser may be controlled in a field sequential method by an unillustrated light emission control section, for example.

The illumination optical system of the image projecting illumination section 1 generates the image projecting illumination light 41 having the spectra of RGB on the basis of light obtained from the light source section.

The light valve 21 modulates the image projecting illumination light 41 on the basis of image data provided from the display control section 8 to generate image light 44. The light valve 21 is a reflective liquid crystal device such as LCOS (Liquid Crystal On Silicon), for example. The image light 44 that is generated by the light valve 21 is projected on the projection plane 30 through the polarization separation element 23 and the projection optical system 4.

The position detecting illumination section 2 serves as a second illumination section that outputs position detecting illumination light 42 serving as second illumination light to be used for position detection of the object 71 whose position is to be detected on the projection plane 30. The position detecting illumination section 2 is provided, for example, at the bottom of a main unit 100. The position detecting illumination section 2 outputs the position detecting illumination light 42 that is substantially collimated relative to the projection plane 30 in such a manner that a projection area 31 of the image light 44 on the projection plane 30 is at least covered with the position detecting illumination light 42 from a predetermined height. The position detecting illumination section 2 may include the infrared light source 200 and the irradiation optical system in the beam irradiation apparatus illustrated in FIG. 1.

The wavelength band of the position detecting illumination light 42 is different from the wavelength band of the image projecting illumination light 41. The wavelength band of the image projecting illumination light 41 is a visible range, and the wavelength band of the position detecting illumination light 42 is a near-infrared range.

The detection image processing section 6 is an image processing section that performs position detection of the object 71 whose position is to be detected on the basis of an imaging result of the imaging section 5. For example, the detection image processing section 6 analyzes a detection signal from the imaging section 5 to acquire positional data (coordinate data) of a detected object. The detection image processing section 6 may have a function to analyze not only the position of the object 71 whose position is to be detected, but also movement such as gesture motion of the object 71 whose position is to be detected.

The illumination control section 7 is set to perform control of switching between On (emission) and Off (non-emission) of the position detecting illumination light 42 to be performed by the position detecting illumination section 2. Further, the illumination control section 7 performs control to perform temporal light-quantity modulation of light obtained from a light source (the infrared light source 200 in FIG. 1) of the position detecting illumination section 2.

The projection optical system 4 includes a projection lens 24. The projection lens 24 may be an ultrashort focus lens. In addition to a function for projecting images, the projection optical system 4 has a function of an imaging optical system for position detection. The image light 44 generated by the light valve 21 enters the projection optical system 4, and scattered light La of the position detecting illumination light 42 derived from the object 71 whose position is to be detected is taken in the projection optical system 4 from the projection plane 30 side.

The imaging section 5 includes an imaging device 22, an imaging optical system 25, and an exposure control section 26.

The imaging device 22 includes a solid-state imaging device such as CMOS (complementary metal-oxide semiconductor) and CCD (charge-coupled device). The imaging device 22 is disposed at a position that is optically conjugated to the projection plane 30. Further, the imaging device 22 is also disposed at a position that is optically conjugated to the light valve 21. More specifically, in a case where the light valve 21 is a reflective liquid crystal device, a display surface (a liquid crystal surface) for creating images thereon and an imaging surface of the imaging device 22 are disposed at positions that are optically conjugated to each other. The scattered light La of the position detecting illumination light 42 enters the imaging device 22 through the projection optical system 4 and the polarization separation element 23. The imaging device 22 allows for imaging by using at least substantially the same area as a projection area 31 on the projection plane 30 as an imaging area.

The imaging optical system 25 is disposed between an optical-conjugated plane of the light valve 21 and the imaging device 22. The imaging optical system 25 includes, for example, a reducing optical system including a plurality of relay lenses, and a bandpass filter. Disposing the reducing optical system including the relay lenses as the imaging optical system 25 makes it possible to provide a position that is optically conjugated to the light valve 21 at a distance farther away from a conjugated plane. Further, disposing the reducing optical system allows for making the size of the imaging device 22 smaller than the size of the light valve 21, while disposing the imaging device 22 at a position that is optically conjugated to the light valve 21.

The exposure control section 26 controls an exposure period and exposure timing (shutter timing) of the imaging device 22. For example, in a case where the imaging device 22 is CCD, etc., the exposure control section 26 controls exposure of the imaging device 22 in a global shutter method. Alternatively, for example, in a case where the imaging device 22 is CMOS, etc., the exposure control section 26 controls exposure of the imaging device 22 in a rolling shutter method.

The polarization separation element 23 is a polarizing beam splitter having four optical surfaces, for example. The image projecting illumination light 41 from the image projecting illumination section 1 enters a first optical surface of the polarization separation element 23. The light valve 21 is disposed on a second optical surface side of the polarization separation element 23. The imaging section 5 is disposed on a third optical surface side of the polarization separation element 23. The projection optical system 4 is disposed on a fourth optical surface side of the polarization separation element 23.

The polarization separation element 23 separates incoming light into a first polarized component (for example, an S-polarized component) and a second polarized component (for example, a P-polarized component) to output the separated light in a different direction. The polarization separation element 23 causes the specific first polarized component to be selectively reflected, and causes the specific second polarized component to be selectively transmitted. The polarization separation element 23 reflects the first polarized component included in the image projecting illumination light 41 that enters the first optical surface toward the light valve 21. The light that is modulated as the second polarized component by the light valve 21 is outputted from the fourth optical surface side of the polarization separation element 23 to enter the projection optical system 4 as the image light 44.

Further, the scattered light La of the position detecting illumination light 42 enters the fourth optical surface side of the polarization separation element 23 through the projection optical system 4. The polarization separation element 23 reflects the first polarized component included in the scattered light La of the position detecting illumination light 42 toward the imaging section 5 through the third optical surface.

(Operation of Position Detection)

As illustrated in FIG. 2, the position detecting illumination section 2 outputs, from the bottom of the main unit 100, the position detecting illumination light 42 that is spread at a wide angle to cover at least the projection area 31 of the image light 44 on the projection plane 30 from a predetermined height. This causes at least the projection area 31 on the projection plane 30 to be covered with a near-infrared light barrier of the position detecting illumination light 42 from the predetermined height. By covering the projection area 31 with such a near-infrared light barrier, the position detecting illumination light 42 is not diffused in the absence of pointing of the object 71 whose position is to be detected such as a finger. In contrast, in a case where, for example, a finger is pointed at the projection area 31, this cuts across the near-infrared light barrier, generating the scattered light La of the position detecting illumination light 42 hitting against, for example, the finger. The scattered light La of the position detecting illumination light 42 enters the imaging device 22 through the projection optical system 4 and the polarization separation element 23. Here, because the imaging device 22 and the projection plane 30 are disposed at positions having a relationship of optical conjugation, there is a one-to-one relationship between an image projecting position and a position at which, for example, the finger is pointed. Therefore, analyzing a detection signal based on an imaging result of the imaging device 22 with the use of the detection image processing section 6 makes it possible to identify a position (coordinates) at which, for example, the finger is pointed on the projection plane 30. The detection image processing section 6 feeds back identified positional information to the display control section 8 to reflect the positional information in image data to be projected. This allows a user to manipulate images using, for example, the finger as a role like a mouse pointer.

1.3 Description of Technique of Reducing Coherence of Irradiation Beam

The projector with the detection function using the LLP method as described above adopts a method that irradiates the projection plane 30, with a narrow clearance left between, with an irradiation beam acting as the position detecting illumination light 42 to detect only the object 71 whose position is to be detected and which cuts across the irradiation beam, and uses a laser light source as the infrared light source 200. Further, the cylindrical lens array L13 is disposed in the irradiation optical system of the beam irradiation apparatus to overlap light fluxes of light obtained from the infrared light source 200, thereby uniformizing light. In this case, the infrared light source 200 is a laser light source, and thus fine strong/weak patterns are generated due to interference between the light fluxes in the process of overlapping the light fluxes. In a state of this non-uniform intensity distribution, a whole detection area of the object 71 whose position is to be detected is irradiated with expanded light as the irradiation beam. Therefore, at a detecting position of the object 71 whose position is to be detected, the positional dependence of object detection can take place in the non-negligible order.

Accordingly, it is desirable that the non-uniformity in the intensity distribution of the irradiation beam be reduced to suppress the positional dependence of object detection.

Here, to achieve stable touch detection, the light quantity of the irradiation beam has to be stable in terms of plane and time. However, in a case where the infrared light source 200 acting as a light source for the irradiation beam is used as a laser light source, a laser beam has high coherence, and thus unevenness of the intensity is likely to be caused in terms of plane and time due to light interference inside the irradiation optical system, etc.

Therefore, in the present embodiment, by varying a drive current of the infrared light source 200 to perform the light-quantity modulation, an oscillating state of the laser beam is intentionally rendered unstable, thereby reducing the coherence. This leads to reduction in the unevenness of the intensity that is caused by interference of the laser beam. The illumination control section 7 (FIG. 3) performs temporal light-quantity modulation of the light obtained from the infrared light source 200 to cause the coherence of the irradiation beam to be reduced.

FIG. 4 illustrates an example of the light-quantity modulation of the irradiation beam in the projector with the detection function according to the present embodiment. FIG. 5 illustrates an example of the intensity distribution of the irradiation beam to be observed with the light-quantity modulation put in Off state. FIG. 6 illustrates an example of the intensity distribution of the irradiation beam to be observed with the light-quantity modulation put in On state. It is to be noted that each of FIG. 5 and FIG. 6 illustrates the intensity distribution of a beam cross section 34 on a wall 33 located at a great distance from the projection area 31, as illustrated in FIG. 2.

FIG. 6 illustrates actual measured values obtained in performing the light-quantity modulation (modulation On) under a condition of two-valued light quantity of 100% and 70%, a duty cycle of 50%, and a 2-millisecond cycle period, as illustrated in FIG. 4. In a case where the light-quantity modulation is put in On state (FIG. 6), the unevenness of the intensity of the irradiation beam is reduced, as compared with a case where the light-quantity modulation is put in Off state (FIG. 5).

Here, in a case where the light-quantity modulation is performed, if a global maximum of the light quantity is 100%; a global minimum of the light quantity is x %; and a duty cycle of the global minimum side of the light quantity is y %, the average light quantity is represented by an expression given below.

$$\text{Average light quantity}[\%] = 100*(100-y)/100 + x*y/100$$

As a matter of course, lowering the global minimum of the light quantity, or raising the duty cycle results in a decrease in the average light quantity. With such a decrease in the average light quantity, a captured image is darkened. To mitigate this negative impact, it is desirable to set the duty cycle at 50%, and the global minimum of the light quantity at 50% or more. In this case, the average light quantity reaches 75% or more, and a decreasing rate of the light quantity in performing the light-quantity modulation remains at 25% or less.

Incidentally, at the time of object detection, the projector with the detection function detects the quantity of return light of the irradiation beam from the object 71 whose position is to be detected such as a finger, and thus, in association with the light-quantity modulation of the light obtained from the infrared light source 200, the modulated light quantity can be detected as the quantity of return light from the object 71 whose position is to be detected. To mitigate this negative impact, it is sufficient to perform the light-quantity modulation at sufficiently faster frequency than an exposure period of the imaging device 22, or reduce a light-quantity modulation width.

However, since an effect of reducing the coherence of the infrared light source 200 to be achieved by the light-quantity modulation relates with a light-quantity modulation frequency and the light-quantity modulation width, the sufficient effect of reducing the coherence is unachievable in some cases if the light-quantity modulation frequency and the light-quantity modulation width are set at any values. Further, because of restrictions in terms of hardware, there can also be a case where the light-quantity modulation is unachievable at sufficiently fast frequency.

Next, the description is provided on workings of a negative impact associated with the light-quantity modulation. Each of FIG. 7 and FIG. 8 illustrates an example of a relationship between the exposure period and light quantity in a state where the light-quantity modulation is turned on. FIG. 7 illustrates an example of a relationship between the exposure period and light quantity in a case where exposure is performed in first exposure timing. FIG. 8 illustrates an example of a relationship between the exposure period and light quantity in a case where exposure is performed in second exposure timing that is different from the first exposure timing.

Each of FIG. 7 and FIG. 8 illustrates a case where two-valued light-quantity modulation is performed. In FIG. 7 and FIG. 8, integral values of the light quantity within the exposure period (portions of halftone dot regions in the drawings) are proportional to the brightness of a captured image. In other words, in a case where a light-quantity modulation cycle period and shutter timing (exposure timing) are asynchronous with each other as seen from FIG. 7 and FIG. 8, this means that the brightness of the captured image varies.

(Case of Global Shutter Method)

FIG. 9 illustrates an example of a relationship between the exposure period and light quantity in a case where the shutter timing and light-quantity modulation timing are synchronized with each other.

In a case where the imaging device 22 is, for example, CCD or any other device, the exposure control section 26 (FIG. 3) performs exposure control of the imaging device 22 in a global shutter method. The exposure control section 26 performs the exposure control based on the global shutter method for the imaging device 22 to cause the exposure period to be synchronized with a modulation cycle period of the light-quantity modulation of the infrared light source 200. FIG. 9 illustrates an example where a falling edge of the light-quantity modulation is synchronized with the shutter timing.

In a case of the global shutter method, as illustrated in FIG. 9, releasing of a shutter in synchronization with the modulation cycle period makes it possible to take in images that are subjected to the same method of light-quantity modulation at all times, which allows for elimination of the negative impact associated with the light-quantity modulation.

(Case of Rolling Shutter Method)

In a case where the imaging device 22 is, for example, CMOS or any other device, the exposure control section 26 performs the exposure control of the imaging device 22 in a rolling shutter method.

In a case where the imaging device 22 is CMOS or any other device, the rolling shutter method is typically available that releases a shutter sequentially in terms of time for pixels in a vertical direction. In this case, there is no taking in the whole captured image at the simultaneous shutter timing, which disables synchronization.

Therefore, a case is considered where the two-valued light-quantity modulation is performed at a duty cycle of 50% as illustrated in FIG. 10.

FIG. 11 illustrates an example of a relationship between a modulation cycle period and modulation leakage of the light-quantity modulation.

FIG. 11 is a graph, in a case where the exposure period of the imaging device 22 is 5 milliseconds, illustrating on a horizontal scale the modulation cycle period [in milliseconds], and on a vertical scale the modulation leakage denoting how much of light that is subjected to the light-quantity modulation leaks into a captured image at worst in taking in images at various kinds of shutter timing.

As seen from the graph, in a case where a relationship given below is established in a case where the exposure period of the imaging device 22 is T, and the light-quantity modulation cycle period is t, the modulation leakage takes a local minimum. In other words, even in a case where the modulation cycle period of the light-quantity modulation and the shutter timing are not synchronized with each other, optimization of a modulation frequency makes it possible to mitigate the negative impact of the light-quantity modulation.

$$t=T/n$$

(where, n is a positive integer. n=1, 2, 3, etc.)

This is because, in a case where the exposure period T is an integer multiple of the modulation cycle period t, integral values of the light quantity within the exposure period (portions of halftone dot regions in the drawings) are fixed irrespective of any shutter timing, as seen from FIG. 12 and FIG. 13. It is to be noted that FIG. 12 illustrates an example of a relationship between the exposure period in the first exposure timing and the light quantity in a case where the two-valued light-quantity modulation is performed. FIG. 13 illustrates an example of a relationship between the exposure period and the light quantity in the second exposure timing in a case where the two-valued light-quantity modulation is performed.

In the above, the description is provided on a case where the light-quantity modulation uses two values, and the duty cycle is 50%. However, even in a case where a light-quantity modulation pattern has multiple values and any value of the duty cycle as illustrated in FIG. 14 and FIG. 15, the modulation leakage takes a local minimum similar to the value in FIG. 11 by satisfying the above expression. However, a position of a local maximum is deviated from that in FIG. 11. It is to be noted that FIG. 14 illustrates an example of a relationship between the exposure period and the light quantity in the first exposure timing in a case where the multiple-valued light-quantity modulation is performed. FIG. 15 illustrates an example of a relationship between the exposure period and the light quantity in the second exposure timing in a case where the multiple-valued light-quantity modulation is performed.

1.4 Effects

As described above, according to the present embodiment, light obtained from a light source that serves as a base of an irradiation beam to be used for detection of a detection object is subjected to temporal light-quantity modulation to cause coherence of the irradiation beam to be reduced, which makes it possible to stabilize the intensity distribution of the irradiation beam. Performing the light-quantity modulation makes it possible to reduce planar and temporal unevenness of the light quantity of the irradiation beam from a laser light source, thereby allowing for stable object detection.

In particular, in a case of the global shutter method, synchronization of the shutter timing with the modulation cycle period makes it also possible to mitigate the negative impact associated with the light-quantity modulation. Further, even in a case where the synchronization of the shutter timing with the modulation cycle period is unattainable, setting a cycle of the light-quantity modulation at an optimal value depending on the exposure period like the rolling shutter method makes it possible to mitigate the negative impact associated with the light-quantity modulation.

It is to be noted that the effects described herein are merely exemplified and non-limiting, and other effects may be further included.

2. Other Embodiments

The technology of the present disclosure is not limited to the descriptions of the respective embodiments in the above, but it is possible to make various modifications.

For example, the present technology may also be configured as follows.

(1)

A projector with a detection function, the projector including:

a projection optical system that projects image light on a projection plane;

an irradiation optical system that generates an irradiation beam on the basis of light obtained from a light source, and outputs the irradiation beam, the irradiation beam being used for detection of a detection object on the projection plane, the detection object being configured to be detected;

an imaging device that scattered light of the irradiation beam derived from the detection object enters; and an illumination control section that performs temporal light-quantity modulation of the light obtained from the light source to cause coherence of the irradiation beam to be reduced.

(2)

The projector with the detection function according to (1), further including an exposure control section that performs exposure control based on a global shutter method for the imaging device to cause an exposure period to be synchronized with a modulation cycle period of the light-quantity modulation.

(3)

The projector with the detection function according to (1), in which, when an exposure period of the imaging device is T, and a modulation cycle period of the light-quantity modulation is t, the illumination control section performs the light-quantity modulation to satisfy t=T/n (where n is a positive integer).

(4)

The projector with the detection function according to any one of (1) to (3), in which the illumination control section performs the light-quantity modulation to cause a global minimum of light quantity to become 50% or more when a duty cycle is 50% and a global maximum of the light quantity is 100%.

(5)

The projector with the detection function according to any one of (1) to (4), in which the irradiation optical system expands the light obtained from the light source in a one-dimensional direction, and outputs light that is substantially collimated relative to the projection plane as the irradiation beam.

(6)

The projector with the detection function according to any one of (1) to (5), further including an image processing section that performs position detection of the detection object on the basis of an imaging result obtained from the imaging device.

This application claims the priority on the basis of Japanese Patent Application No. 2017-057219 filed on Mar. 23, 2017 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projector with a detection function, the projector comprising:
    an imaging device;
    a projection optical system configured to project image light on a projection plane;
    a lens unit that includes a first irradiation lens and a second irradiation lens;
    an irradiation optical system configured to:
        generate a first irradiation beam based on a laser light obtained from a laser light source, wherein
            the laser light is directed to the lens unit after collimation, and
            each of the first irradiation lens and the second irradiation lens is configured to expand the laser light directed to the lens unit; and
        output the expanded laser light as the first irradiation beam through a lens for irradiation, wherein the first irradiation beam is for detection of a detection object on the projection plane;
    an exposure control section configured to:
        perform exposure control of the imaging device; and
        synchronize, based on the exposure control, an exposure period of the imaging device with a modulation cycle period of temporal light-quantity modulation of the laser light, wherein the imaging device is configured to receive, based on the exposure period, scattered light of the first irradiation beam derived from the detection object; and
    an illumination control section configured to perform the temporal light-quantity modulation of the laser light obtained from the laser light source.

2. The projector with the detection function according to claim 1, wherein the exposure control section is further configured to perform the exposure control of the imaging device based on a global shutter method.

3. The projector with the detection function according to claim 1, wherein, in a case where the exposure period of the imaging device is T and the modulation cycle period of the temporal light-quantity modulation is t, the illumination control section is further configured to perform the temporal light-quantity modulation to satisfy t=T/n (where n is a positive integer).

4. The projector with the detection function according to claim 1, wherein the illumination control section is further configured to perform the temporal light-quantity modulation to cause a global minimum of light quantity to become at least 50% when a duty cycle is 50% and a global maximum of the light quantity is 100%.

5. The projector with the detection function according to claim 1, wherein the laser light is expanded in a one-dimensional direction by the lens unit.

6. The projector with the detection function according to claim 1, further comprising an image processing section configured to perform position detection of the detection object based on an imaging result obtained from the imaging device.

7. The projector with the detection function according to claim 1, wherein the laser light source is an infrared light source.

8. The projector with the detection function according to claim 7, wherein the illumination control section is further configured to control an oscillating state of the laser light obtained from the laser light source.

9. The projector with the detection function according to claim 8, wherein the illumination control section is further configured to control the oscillating state of the laser light to be unstable.

10. The projector with the detection function according to claim 1, wherein the illumination control section is further configured to control, based on the temporal light-quantity modulation of the laser light obtained from the laser light source, a coherence of the first irradiation beam with respect to a second irradiation beam different from the first irradiation beam.

* * * * *